United States Patent [19]

Brierley et al.

[11] Patent Number: 5,127,942
[45] Date of Patent: Jul. 7, 1992

[54] MICROBIAL CONSORTIUM TREATMENT OF REFRACTORY PRECIOUS METAL ORES

[75] Inventors: James A. Brierley, Sandy, Utah; Charles F. Kulpa, Niles, Mich.

[73] Assignee: Newmont Mining Corporation, Denver, Colo.

[21] Appl. No.: 750,444

[22] Filed: Aug. 20, 1991

Related U.S. Application Data

[63] Continuation of Ser. No. 586,424, Sep. 21, 1990, abandoned.

[51] Int. Cl.$^5$ .............................................. C22B 11/00
[52] U.S. Cl. .................................... 75/743; 423/22
[58] Field of Search ............................ 75/243; 423/22

[56] References Cited

U.S. PATENT DOCUMENTS

| | | | |
|---|---|---|---|
| 4,293,333 | 10/1981 | Drobot | 423/22 |
| 4,293,334 | 10/1981 | Drobot | 423/22 |
| 4,448,886 | 5/1984 | Gestaut | 423/22 |
| 4,729,788 | 3/1988 | Hutchins | 423/22 |
| 4,732,608 | 3/1988 | Emmett | 423/22 |

*Primary Examiner*—Peter D. Rosenberg
*Attorney, Agent, or Firm*—Fred A. Keire; David M. McConoughey

[57] ABSTRACT

A method is provided for the recovery of precious metals, such as gold and silver, from refractory carbonaceous sulfidic material. The carbonaceous sulfidic material is ground and placed in heaps or piles or pulped or slurried and bioleached to oxidize the sulfide minerals using bacteria at temperatures from about 15° C. and up to about 40° C. The biooxidized residue is then treated using a specific microbial consortium, or a product of the microbial consortium, at temperature from about 5° C. to 40° C. to deactivate the carbonaceous component of the material to prevent binding of the precious metal to the carbonaceous component. The precious metal liberated in the residue remaining from the biological oxidation of sulfide and deactivation of carbon are recovered by dissolution.

24 Claims, No Drawings

MICROBIAL CONSORTIUM TREATMENT OF REFRACTORY PRECIOUS METAL ORES

This application is a continuation of application Ser. No. 07/586,424, filed Sept. 21, 1990 now abandoned.

The invention relates to the recovery of precious metals from refractory carbonaceous sulfide materials, e.g., carbonaceous sulfide leach grade ores, carbonaceous sulfide mill grade ores, concentrates, tailings, among other sulfide materials, and carbonaceous ores.

STATE OF THE ART

It is known to subject sulfide materials containing precious metals, such as mineral sulfides, tailings, and the like, to pre-oxidation in order to liberate gold and silver and enhance the recovery thereof by cyanide leaching, particularly sulfide minerals having a carbonaceous component that renders the mineral sulfide refractory to treatment.

Such sulfide materials frequently contain iron in the ferrous state with or without other metals in the form of complex compounds. The precious metals are usually occluded within the sulfide mineral. For example, gold occurs as finely disseminated sub-microscopic particles in a refractory sulfide host, such as pyrite or arsenopyrite, and not as a solid solution as is often mistakenly thought. Because of the foregoing characteristic, this type of occluded gold cannot be liberated easily by fine grinding and then directly and efficiently recovered by cyanidation. Attempts to recover gold by this method generally result in recoveries in the neighborhood of about 20% to 60% and in high cyanide consumption which renders the process uneconomical.

One method for freeing up the precious metals has been to subject the sulfide material to oxidation roasting to remove sulfur as $SO_2$ and provide an oxide residue which is thereafter leached with a cyanide solution to dissolve the liberated gold and silver. The gold and silver are thereafter subsequently recovered from solution using known processes. However, oxidation roasting of sulfide ores or concentrates present environmental pollution problems and also tend to be cost intensive. Even then it may be difficult to remove the precious metals by cyanidation.

To avoid the aforementioned environmental pollution problems associated with the oxidation roasting of sulfide ores, oxidative bioleaching of the ore has been proposed.

One known method is to use bacteria, such as *Thiobacillus ferrooxidans*, Sulfolobus, Acidianus species and facultative-thermophilic bacteria, to oxidize sulfide minerals. This method results in solubilization of metal values from the minerals. The foregoing microorganisms also oxidize pyrite resulting in solubilization of iron as ferric iron, and sulfide, as sulfate ion. This process has been proposed for enhancing the recovery of gold from refractory sulfide materials in which the precious metals ar present as finely disseminated microscopic particles in the sulfide host, e.g., pyrite or arsenopyrite.

U.S. Pat. No. 4,729,788 which issued on Mar. 8, 1988, and which is incorporated herein by reference discloses a bioleaching process for precious metals enhanced recovery from carbonaceous sulfide ore. According to the process disclosed, thermophilic bacteria, such as Sulfolobus species and facultative-thermophilic bacteria, are used to oxidize the sulfide constituents of the ore. The bioleached residue is then treated with a carbon-adsorbable blanking agent to inhibit the precious-metal-adsorbing propensity of the carbonaceous component of the ore. The precious metals are then extracted from the ore using a solution of cyanide or thiourea. The carbon-adsorbable blanking agent disclosed in the patent is not a product of a microbial consortium as is disclosed in the present invention.

It would be desirable to provide a bioleaching process for recovering precious metals, e.g., gold and silver, from refractory sulfide and refractory carbonaceous sulfide material using bacteria which are viable at low and elevated temperatures, i.e., temperatures of 15° C. and above, for example, temperatures ranging from over about 15° C. to about 90° C.

OBJECTS OF THE INVENTION

It is an object of the invention to provide a biooxidation process for the recovery of precious metals from refractory carbonaceous sulfidic material.

Another object is to provide a biological process for the deactivation of the preg-robbing carbon component of the refractory carbonaceous sulfidic material to inhibit binding of dissolved precious metals to the carbonaceous material.

These and other objects will be described in the following disclosure.

STATEMENT OF THE INVENTION

It is an object of the invention to provide a biooxidation process for the recovery of precious metals from refractory carbonaceous sulfidic material.

Another object is to provide a biological process for the deactivation of the preg-robbing carbon component of the refractory carbonaceous sulfidic material to inhibit binding of dissolved precious metals to the carbonaceous material.

These and other objects will be described in the following disclosure.

Stating it broadly, the invention is directed to a method for recovering precious metals from refractory carbonaceous sulfide ores by oxidative bioleaching in which the carbonaceous component thereof has the propensity of adsorbing said precious metals following liberation thereof from the leached sulfide ore thereby adversely affecting the efficiency of recovery of said precious metals from the leached residue of said ore One embodiment comprises inoculating the ore residue following completion of the oxidative bioleaching with a carbon-deactivating bacterial consortium in the presence of nutrients therefor to promote the growth of the bacterial consortium, the bacterial consortium being characterized by the property of deactivating the precibus-metal-adsorbing propensity of the carbonaceous component and thereby liberate the precious metal for subsequent recovery by leaching with an aqueous solution selective to the dissolution of said precious metal.

The first step comprises bioleaching the mineral sulfide containing the occluded precious metal with an aqueous solution containing the iron- and sulfide-oxidizing bacteria capable of promoting the oxidation of the mineral sulfide at temperatures from about 15° C. to about 90° C., but not exceeding that temperature above which the particular group of microorganisms is not viable. The bioleaching is carried out in the presence of nutrients required by the bacteria for growth for a time sufficient to oxidize the sulfide material and substantially liberate the precious metal. The bioleach solution is acid with a pH ranging from about 0.5 to 5, preferably about 0.5 to 2. Following bioleaching, the residue is neutralized, if necessary, to a pH ranging from about 1 to 10, preferably 3 to 7.5.

The biooxidized residue is then inoculated with the microbial consortium capable of deactivating the precious-metal-adsorbing carbon. The carbon deactivation procedure is conducted in a solution containing nutrients for a period of time from at least about 24 hours to about 168 hours or longer. The biooxidized residue may also be treated using previously grown microbial consortium to provide a large quantity of the consortium and products of the growth of the microbial consortium. This procedure as above requires a period of time from at least 1 hour to 168 hours or longer for treatment of the ore. The precious-metal-containing residue is thereafter leached with an aqueous leach solution selective to the dissolution of the liberated precious metal.

The sulfide oxidation can be achieved using various types of chemolithotrophic autotrophic bacteria. *Thiobacillus ferrooxidans* bacteria are suitable for sulfide oxidation within the temperature range of 15° C. to 40° C. The facultative-thermophilic iron-oxidizing bacteria oxidize sulfides in a temperature range of about 35° C. to 55° C. The Sulfolobus and Acidianus species are active from about 50° C. to 90° C.

In accordance with the above, the bacteria used for oxidative leaching comprise at least one bacteria selected from the group consisting of *Thiobacillus thiooxidans, Thiobacillus ferrooxidans, Leptosoirillum, Thermosulfidooxidans, Sulfolobus brierlevi, Sulfolobus acidocaldarius*, Sulfolobus BC and *Sulfolobus solfataricus*.

The microbial consortium for carbon deactivation consists of mixed cultures containing several genera, at least 2 or 3 to 5 distinct types. At least one of the microbes is capable of growth on hydrocarbons such as kerosene and hexadecane. The consortium contains members of the genera Psuedomonas and Arthrobacter among others.

The carbon deactivating bacterial consortium comprises at least two bacteria selected from the group consisting of *Pseudomonas maltophilia, Pseudomonas oryzihabitans, Pseudomonas putida, Pseudomonas fluorescens. Pseudomonas stutzeri,* Achromobacter species, Arthrobacter species, and Rhodococcus species.

One particular consortium which is comprised of *Pseudomonas maltophilia, Pseudomonas oryzihabitans,* including an Achromobacter and Arthrobacter species is referred to as the Carlin Black consortium (ATCC No. 55218) which originates from the Newmont Gold Mining Company's Carlin Mine.

Another consortium which is comprised of *Pseudomonas putida, Pseudomonas fluorescens, Pseudomonas stutzeri, Pseudomonas maltophilia,* and Arthrobacter species is referred to as Plant One consortium, (ATCC No. 55219) that is, it originates from Plant One of the Newmont Gold Mining Company's Plant One.

Another embodiment of the invention is directed to a method of recovering precious metals from a refractory carbonaceous sulfide comprising, subjecting the ore to oxidative leaching in the presence of at least one bacterium selected from the group consisting of *Thiobacillus thiooxidans, Thiobacillus ferrooxidans, Leptospirillum. Thermosulfidooxidans, Sulfolobus brierleyi, Sulfolobus acidocaldarius,* Sulfolobus BC and *Sulfolobus solfataricus* at a temperature ranging from 15° C. to 40° C. and higher but not exceeding that temperature at which said bacterium is degraded and for a time at least sufficient to substantially oxidize the sulfide ore and provide a residue containing liberated precious metals.

The invention further comprises adjusting the pH of said residue, if necessary, to a pH ranging from about 1 to 10, followed by inoculating the residue with a carbon-deactivating microbial consortium comprising at least two bacteria selected from the group consisting of *Pseudomonas maltophilia. Pseudomonas oryzihabitans, Pseudomonas putida. Pseudomonas fluorescens, Pseudomonas stutzeri, Achromobacter* species, Arthrobacter species, and Rhodococcus species to liberate precious metals adsorbed by said carbonaceous component of said ore residue, and then mixing the carbon-deactivated residue with an aqueous solution selective to the dissolution of the liberated precious metals and thereby recover the precious metals.

The precious metal, e.g., gold or silver, is preferably recovered from the leached and carbon-deactivated residue by cyanidation which is a well-known process. Thiourea solutions can also be used to recover the precious metals.

DETAILS OF THE INVENTION

Example 1

The microbial consortium is enriched from weathered or non-weathered ore by the ability of the microorganisms to utilize petroleum and other hydrocarbons, such as kerosene or hexadecane, to grow under aerobic conditions. This is accomplished by placing 20 g of ore in 100 ml of a nutrient salts solution containing 0.5% kerosene or hexadecane or othe suitable hydrocarbon and 0.005% Difco yeast extract. The mixture is incubated at ambient temperature for one week with aeration. After one week, 5 ml of the solution is transferred to a new flask of nutrient salts medium and hydrocarbon and incubated as above. This is repeated 3 times. The microbial consortium is then maintained in the nutrient salts-hydrocarbon medium.

The nutrient medium for the growth of the microbial consortium may consist of the following: 7.26 g/l potassium phosphate monobasic ($KH_2PO_4$); 22.2 g/l potassium phosphate dibasic ($K_2HPO_4$); 3.96 g/l ammonium sulfate [$(NH_4)_2SO_4$]; 0.2 g/l magnesium sulfate heptahydrate ($MgSO_4.7H_2O$); 0.05 g/l yeast extract; and 0.25 to 1.0% kerosene or hexadecane; final pH 7.1 adjusted with either sulfuric acid ($H_2SO_4$) or caustic (NaOH) as needed. Growth is with aeration at temperatures ranging from 15° C. to 25° C. Significant growth generally occurs in 2 to 5 days. The consortium can be used to treat the ore after 2 days, or longer, of growth.

Example 2

The microbial consortium is able to decrease the capacity of the organic component of refractory ore to bind gold in the form of gold cyanide. A sulfidic-carbonaceous ore, from Newmont Gold Company's Gold Quarry Deep West deposit, described below, was treated with the microbial consortium to prevent adsorption of gold present as the gold cyanide complex.

| Component | Weight |
|---|---|
| Total sulfur | 2.95 |
| Sulfate sulfur | 0.45 |
| Sulfide sulfur | 2.50 |
| Total carbon | 0.77 |
| Acid insoluble (organic) carbon | 0.76 |

The ore was treated in one-liter stirred reactors. One treatment entailed treating 40 g of the ground ore in 500 ml of the consortium culture grown in the medium containing 0.5% kerosene described in Example 1. Another treatment grew the consortium in the presence of 40 g of ground ore with 500 ml of the medium containing 0.5% kerosene described in Example 1. Another treatment grew the consortium in the presence of 40 g of ground ore with 500 ml of the medium containing 0.5% kerosene described in Example 1. The ore was treated for two weeks with stirring then separated from the solution, dried at ambient room temperature, 20° C. to 25° C., and tested for adsorption of gold cyanide. Five grams of treated, or untreated, ore was placed in a solution of potassium gold cyanide [$KAu(CN)_2$] containing either 2 or 5 mg Au/l at pH 10.5 to 11.5. The ore samples and gold cyanide solution were mixed for a period of 25 hours, 250 rpm, at ambient room temperature, 20° C. to 25° C. The ore was separated from the solution and the concentration of gold remaining in solution determined by atomic adsorption spectrophotometry. The results of the consortium treatment of the ore, Table 1, show the effect of the consortium to decrease the adsorption of the gold cyanide complex.

TABLE 1

| Treatment | Gold Concentration. mg/l | | Gold Adsorbed % |
|---|---|---|---|
| | Initial | Final | |
| untreated | 2 | 0.2 | 90 |
| | 5 | 1.6 | 68 |
| treated with pre-grown consortium | 2 | 1.5 | 25 |
| | 5 | 4.9 | 5 |
| treated by growing consortium with ore | 2 | 1.7 | 15 |
| | 5 | 4.1 | 18 |

The untreated ore effectively adsorbs gold from the gold cyanide solution, a phenomenon which prevents economic extraction of gold from the carbonaceous-sulfidic ore. Following treatment of the ore with the microbial consortium, the adsorption of the gold cyanide complex is significantly reduced. The apparent function of the consortium is to modify the properties of the carbon in the ore to prevent the removal of the solubilized gold. The consortium treatment facilitates gold recovery by either blocking or modifying the gold-adsorbing carbon of the refractory ore.

Example 3

A sulfidic-carbonaceous gold ore, containing 0.9 ounce gold per ton, from the Newmont Gold Mining Company's Post ore deposit was treated in accordance with the invention.

| Component | Weight % |
|---|---|
| Total sulfur | 2.86 |
| Sulfate sulfur | 0.19 |
| Sulfide sulfur | 2.67 |
| Total carbon | 0.71 |
| Acid insoluble (organic) carbon | 0.67 |

A sample of the ore, ground to 80% minus 200 mesh, was first oxidized using a culture of *Thiobacillus ferrooxidans* with a nutrient acid solution as follows: 400 mg/l ammonium sulfate [$(NH_4)_2SO_4$]; 40 mg/l potassium phosphate dibasic ($K_2HPO_4$); 400 mg/l magnesium sulfate heptahydrate ($MgSO_4.7H_2O$); and pH 1.6 to 2.0, adjusted with sulfuric acid ($H_2SO_4$). The biooxidation was accomplished in a stirred-tank-reactor, containing the ore at 40% pulp density, over a period of 14 days. This treatment of the ore resulted in oxidation of 48.7% of the sulfide. The oxidized ore was separated from the suspending solution and resuspended in a pre-grown culture of the "Carlin Black" microbial consortium, at pH 3.12 for a period of 7 days. The oxidized ore treated with the "microbial consortium" was separated from the suspending medium. The ore was then leached using cyanide and cyanide-CIL (carbon-in-leach) for extraction of gold. The results obtained for the untreated ore, and the samples treated with the above procedures are given in Table 2.

TABLE 2

| Treatment | Percent Gold Extraction | |
|---|---|---|
| | Cyanide | Cyanide-CIL |
| Untreated | 0 | 4 |
| Biooxidized | 55.5 | 82.2 |
| Biooxidized and microbial consortium | 74.4 | 86.6 |

The biooxidation of the sample with *Thiobacillus ferrooxidans* increases gold extraction by cyanide from zero, for the untreated control, to 55.5%. Addition of carbon for the cyanide-CIL for gold leaching increases gold extraction to 4%, for the untreated control, and to 82.2% for the biooxidized ore. The presence of the gold-recovery carbon in the cyanide leach process greatly enhances gold recovery from the biooxidized ore residue because the CIL-carbon more effectively adsorbs the gold-cyanide complex than the pregrobbing carbon present in the ore. Greater gold extraction occurs when the ore sample is treated by a combination of biooxidation and microbial consortium treatment, resulting in 74.4% extraction by a simple cyanide leach, and 86.6% by the cyanide-CIL leach procedure.

Example 4

A sulfidic-carbonaceous ore, from Newmont Gold Company's Gold Quarry Deep West deposit containing 0.156 ounce gold per ton, and described in Example 2, can also be treated using a Percolation-column procedure simulating a heap leach treatment process.

A sample of the ore, crushed and sized to minus 6 mesh plus 10 mesh fraction (U.S.A. standard testing sieve), was first oxidized using a culture of *Thiobacillus ferrooxidans* for a period of 71 days. The nutrient solution and bacteria were recirculated through the column of ore during this period. This treatment of the ore resulted in oxidation of 69.7% of the sulfide. One-half of the biooxidized ore residue was then treated using the Carlin Black microbial consortium by recirculating a culture of the consortium through a column of ore for a period of 14 days. The biooxidized ore treated using the microbial consortium were then leached using cyanide-CIC (carbon-in-column) and thiourea-CIC for a period of 7 days. Without biooxidation pretreatment, gold extraction from this ore was nil. However, following biooxidation and biooxidation with consortium treatment the gold extraction was increased (Table 3).

TABLE 3

| Treatment | Percent Gold Extraction | |
|---|---|---|
| | Cyanide-CIC | Thiourea-CIC |
| Biooxidized | 13.5 | 57.1 |
| Biooxidized and | 41.4 | 63.5 |

TABLE 3-continued

| Treatment | Percent Gold Extraction | |
|---|---|---|
| | Cyanide-CIC | Thiourea-CIC |
| microbial consortium | | 5 |

Gold extraction from the biooxidized residue is low, 13.5%, using cyanide, but thiourea is more effective resulting in 57.1% extraction of the gold. Treatment of the biooxidized residue with the Carlin Black microbial consortium further enhances the extraction of the gold using either cyanide or thiourea.

Example 5

The refractory sulfidic-carbonaceous gold ore, described in Example 4, can also be treated by the microbial process in a stirred-tank reactor. A sample of the ore, ground to 80% minus 200 mesh, at 40% pulp density, was oxidized using a culture of Thiobacillus ferrooxidans for a period of 14 days. The residue had 66.4% oxidation of the sulfide component. The oxidized ore was separated from the suspending nutrient solution and resuspended in a pre-grown culture of the Carlin Black microbial consortium at pH 6.9 to 7.2 for 7 days. Following the consortium treatment, 73.7% of the gold was extracted by cyanide-CIL. Without consortium treatment, 46% to 54% of the gold can be extracted by cyanide-CIL from the biooxidized residue.

The terms CIL and CIC used hereinabove mean carbon-in-each and carbon-in-carbon, respectively.

The carbon-in-leach technique involves contacting the ore pulp with granular carbon and cyanide or thiourea solutions in a series of gently agitated tanks with sufficient retention time for recovery of the precious metal on the carbon. The carbon is passed counter current to the ore through the circuit to build up to precious metal loading. The loaded carbon is then separated from the pulp on a suitable screen coarse enough to retain the carbon but fine enough to allow the pulp to pass. The carbon is sent to a stripping column for desorption and recovery of the precious metal and regeneration of the carbon.

The carbon-in-column technique involves extraction of the precious metal from the ore using a cyanide solution. The pregnant (gold loaded) solution is then passed through a series of carbon columns to recover the precious metal on the carbon. The loaded carbon is sent to a stripping process for desorption and recovery of the precious metal and regeneration of the carbon.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and the appended claims.

What is claimed:

1. In a method for recovering precious metals from a refractory carbonaceous sulfide ore by oxidative bioleaching, said ore characterized by a carbonaceous component which has the propensity of adsorbing said precious metals following liberation thereof from the leached sulfide ore thereby adversely affecting the efficiency of recovery of said precious metals from the leached residue of said ore, the improvement comprising:

subjecting precious metal-containing refractory carbonaceous ore to oxidative bioleaching and provide an ore residue containing said precious metal, and inoculating said ore residue following completion of said oxidative bioleaching with a carbon-deactivating bacterial consortium in the presence of nutrients therefor to promote the growth of said bacterial consortium, said bacterial consortium being characterized by the property of deactivating the precious-metal-adsorbing propensity of said carbonaceous component and thereby liberate said precious metal for subsequent recovery by leaching with an aqueous solution selective to the dissolution of said precious metals.

2. The method of claim 1, wherein the carbon deactivating bacterial consortium comprises at least two bacteria selected from the group consisting of Pseudomonas, maltophilia, Pseudomonas oryzihabitans, Pseudomas putida, Pseudomonas fluorescens, Pseudomonas stutzeri, Achromobacter species, Arthrobacter species, and Rhodococcus species.

3. The method of claim 2, wherein said consortium is comprised of Pseudomonas maltophilia, Pseudomonas oryzihabitans, Achromobacter and Arthrobacter species, also referred to as the Carlin Black consortium.

4. The method of claim 2, wherein said consortium is comprised of Pseudomonas putida. Pseudomonas fluorescens, Pseudomonas stutzeri, Pseudomonas maltophilia and Arthrobacter species, also referred to as Plant One consortium.

5. The method of claim 1, wherein the oxidative bioleaching is carried in the presence of at least one bacteria selected from the group consisting of Thiobacillus thiooxidans, Thiobacillus ferrooxidans, Leptospirillum, Thermosulfidooxidans, Sulfolobus brierleyi, Sulfolobus acidocaldarius, Sulfolobus BC and Sulfolobus solfataricus.

6. The method of claim 1, wherein following the carbon-deactivation of said ore residue, the precious metals are recovered by leaching with an aqueous solution selected from the group consisting of an alkali or alkaline metal cyanide and thiourea.

7. The method of claim 1, wherein said biooxidation leach is carried out with the ore either as a slurry or by heap leaching.

8. A method of recovering precious metals from a refractory carbonaceous sulfide ore characterized by a carbonaceous component which has the propensity of adsorbing the precious metals liberated during biooxidation leaching of said ore which comprises:

subjecting said ore to oxidative leaching in the presence of at least one bacterium capable of biooxidizing said sulfide ore, at a temperature ranging from about 15° C. to 90° C. but not exceeding that temperature at which said at least one bacterium is degraded and for a time at least sufficient to substantially oxidize said sulfide ore and provide a residue containing liberated precious metals, adjusting the pH of said residue, if necessary, to a pH ranging from about 1 to 10, inoculating said residue with a carbon-deactivating microbial consortium to liberate precious metals adsorbed by said carbonaceous component of said ore residue, and then mixing said carbon-deactivated residue with an aqueous solution selective to the dissolution of said precious metals to recover said precious metals.

9. The method of claim 8, wherein the carbon deactivating bacterial consortium comprises at least two bacteria selected from the group consisting of *Pseudomonas hilia, Pseudomonas orvzihabitans, Pseudomas putida, Pseudomonas fluorescens, Pseudomonas stutzeri,* Achromobacter species, Arthrobacter species, and Rhodococcus species.

10. The method of claim 9, wherein said consortium is comprised of *Pseudomonas maltophilia, Pseudomonas oryzihabitans,* Achromobacter and Arthrobacter species, also referred to as the Carlin Black consortium.

11. The method of claim 9, wherein said consortium is comprised of *Pseudomonas putida, Pseudomonas fluoresoens. Pseudomonas stutzeri. Pseudomonas maltophilia* and Arthrobacter species, also referred to as Plant One consortium.

12. The method of claim 8, wherein the oxidative bioleaching is carried in the presence of at least one bacteria selected from the group consisting of *Thiobacillus thiooxidans, Thiobacillus ferrooxidans,* Leptosoirillum, Thermosulfidooxidans, *Sulfolobus brierleyi, Sulfolobus acidocaldarius,* Sulfolobus BC and *Sulfolobus solfataricus.*

13. The method of claim 8, wherein following the carbon-deactivation of said ore residue, the precious metals are recovered by leaching with an aqueous solution selected from the group consisting of an alkali or alkaline earth metal cyanide and thiourea.

14. The method of claim 8, wherein said biooxidation leach is carried out with the ore either as an aqueous slurry or by heap leaching.

15. A method of recovering precious metals from a refractory carbonaceous sulfide ore characterized by a carbonaceous component which has the propensity of adsorbing the precious metals liberated during biooxidation leaching in the presence of at least one
subjecting said ore to oxidative leaching in the presence of at least one bacterium selected from the group consisting of *Thiobacillus thiooxidans, Thiobacillus ferrooxidans.* Leptospirillum, Thermosulfidooxidans, *Sulfolobus brierleyi, Sulfolobus acidocaldarius.* Sulfolobus BC and *Sulfolobus solfataricus* at a temperature ranging from about 15° C. to 90° C. but not exceeding that temperature at which at least one said bacterium is degraded and for a time at least sufficient to substantially oxidize said sulfide ore and provide a residue containing liberated precious metals,
adjusting the pH of said residue, if necessary, to a pH ranging from about 1 to 10,
inoculating said residue with a carbon-deactivating microbial consortium comprising at least two bacteria selected from the group consisting of *Pseudomonas maltochilia, Pseudomonas orvzihabitans, Pseudomas putida, Pseudomonas fluorescens, Pseudomonas stutzeri,* Achromobacter species, Arthrobacter species, and Rhodococcus species to liberate precious metals adsorbed by said carbonaceous component of said ore residue,
and then mixing said carbon-deactivated residue with an aqueous solution selective to the dissolution of said precious metals to recover said precious metals.

16. The method of claim 15, wherein said consortium is comprised of *Pseudomonas maltoohilia, Pseudomonas oryzihabitans,* Achromobacter and Arthrobacter species, also orvzihabitans referred to as the Carlin Black consortium.

17. The method of claim 15, wherein said consortium is comprised of *Pseudomonas putida. Pseudomonas fluorescens. Pseudomonas stutzeri. Pseudomonas maltophilia* and Arthrobacter species, also referred to as Plant One consortium.

18. The method of claim 15, wherein following the carbon-deactivation of said ore residue, the precious metals are recovered by leaching with an aqueous solution selected from the group consisting of an alkali or alkaline earth metal cyanide and thiourea.

19. The method of claim 15, wherein said biooxidation leach is carried out with the ore either as an aqueous slurry or by heap leaching.

20. A method for preparing a microbe consortium for neutralizing the precious-metal-adsorbing propensity of carbon contained in a refractory carbonaceous sulfide ore containing precious metals which comprises:
forming an aqueous slurry of said precious-metal-containing carbonaceous sulfide ore;
adding to said slurry containing nutrients for microbial growth a consortium of microbes specific to the neutralization of the precious-metal-adsorbing propensity of the carbon in said carbonaceous sulfide ore,
and then allowing said microbial consortium to grow under aerobic conditions using a hydrocarbon as the substrate.

21. The method of claim 20, wherein said microbial consortium is comprised of a mixture of species of the genera Pseudomonas, Arthrobacter, Archromobacter and Rhodoccus species.

22. The method of claim 21, wherein the carbon deactivating bacterial consortium comprises at least two bacteria selected from the group consisting of *Pseudomonas maltophilia, Pseudomonas oryzihabitans, Pseudomonas putida, Pseudomonas fluorescens, Pseudomonas stutzeri,* Achromobacter species, Arthrobacter species and Rhodococcus species.

23. The method of claim 22, wherein said consortium is comprised of *Pseudomonas maltophilia, Pseudomonas oryzihabitans,* Archromobacter and Arthrobacter species, also refered to as the Carlin Black consortium.

24. The method of claim 21 wherein said consortium is comprised of *Pseudomonas putida, Pseudomonas fluorescens, Pseudomonas stutzeri, Pseudomonas maltophilia* and Arthrobacter species, also referred to as Plant One consortium.

* * * * *